INVENTOR
RICHARD PATRICK REMSHAW
CHARLES RONALD MUSICK
BY Stephen A. Schnelberger
ATTORNEY

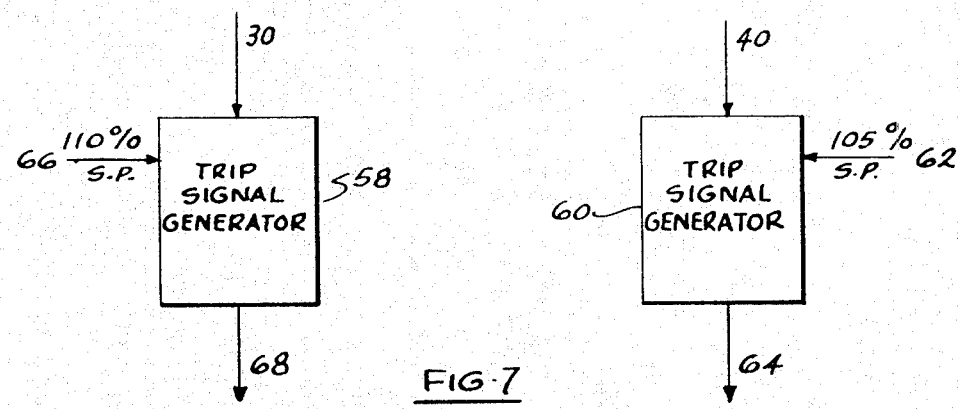
FIG·7
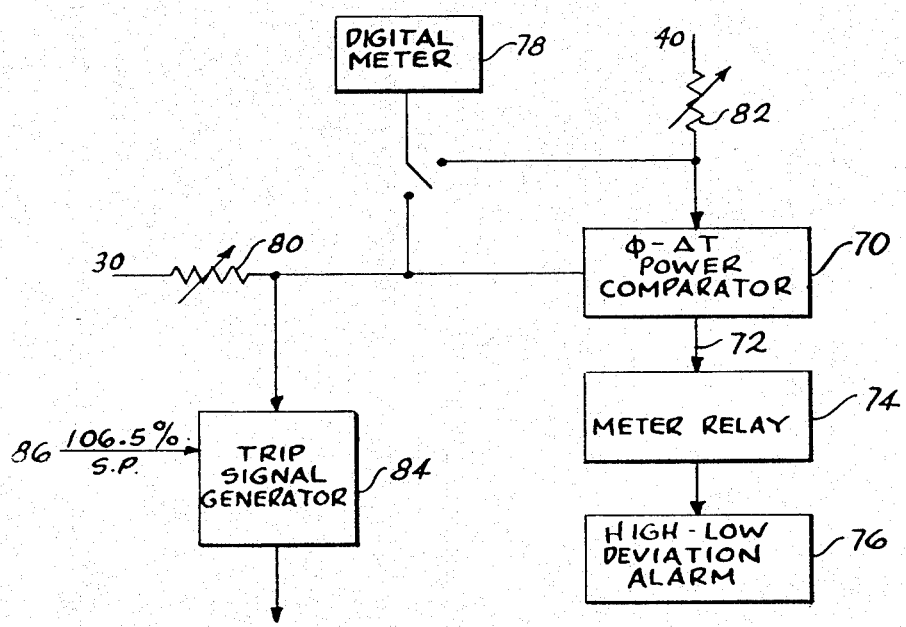
FIG·8

No. 3,752,735
INSTRUMENTATION FOR NUCLEAR REACTOR CORE POWER MEASUREMENTS

Charles R. Musick, Rockville, Conn., and Richard P. Remshaw, Brooklyn, N.Y., assignors to Combustion Engineering, Inc., Windsor, Conn.
Filed July 16, 1970, Ser. No. 55,331
Int. Cl. G21c 17/00
U.S. Cl. 176—19
8 Claims

ABSTRACT OF THE DISCLOSURE

In a nuclear reactor system, at least two independent measures of reactor core power are provided with one being dependent on neutron flux and the other on coolant thermal parameters. The two independent measures of core power are interrelated in a manner which exploits the advantages of each while avoiding inherent limitations of either to provide a more accurate determination of core power for a variety of system conditions.

BACKGROUND OF THE INVENTION

The invention relates to core power measurements in a nuclear reactor system and more particularly to using the neutron flux and the thermal parameters of the reactor coolant, respectively, to provide two measures of core power independent of one another. Still more particularly the invention relates to the interrelating of the neutron flux power measure signal and the coolant thermal power measure signal in a manner which exploits advantages of each while avoiding inherent limitations of each to provide a more accurate determination of core power for a variety of system conditions.

A requirement exists in nuclear reactor systems, particularly in conjunction with the aspect of safety of operation, to monitor the total reactor core power output. An accurate indication of core power is necessary and existing systems rely on neutron flux measurements to provide these indications. However, the neutron flux detectors, and most particularly out-of-core flux detectors, are subject to various effects which may result in errors which impair the accuracy of their power indicating function.

Changes in the coolant temperature and the control rod geometry each create a "shadowing" effect on the neutron flux detectors. The flux detectors are dependent, for accuracy, upon a non-varying view of the neutron source in the reactor core. However, movement of the control rods may interrupt this view and additionally, changes in the coolant temperature affect the coolant density and accordingly its properties as a moderator thereby also having a shadowing effect on the detectors. These shadowing effects are capable of producing quite large errors in the neutron flux generated indication of core power. These factors which cause the shadowing and which affect the accuracy of the flux detectors are variable and a constant compensation factor is incapable of correcting for them. Further, the determination of a varying compensation factor based on the large variety of rod configuration and coolant density combinations is sufficiently complex as to be ruled out.

A need, therefore, exists to provide an accurate core power signal which is unaffected by the shadowing of the neutron flux. A measurement of the thermal energy input to the primary coolant which passes through the reactor core provides the means for generating a core power signal which is quite accurate, particularly for steady state reactor operation and slow to intermediate speed power transients. Such a signal, hereinafter referred to as a $\Delta T$ power signal, is most advantageously used when interrelated with the flux power measure signal in a manner which exploits the ability of the flux power signal to more accurately respond to faster reactor power transients and the freedom of the $\Delta T$ power signal from flux shadowing. The resultant effect is a signal or signals which more accurately indicate reactor power under all operating conditions than previously existed.

SUMMARY OF THE INVENTION

According to the present invention, an electrical signal linearly proportional to total core power is developed using only the plant hot and/or cold leg primary coolant loop temperatures as inputs.

The thermal energy added to the primary loop coolant as it passes through the reactor core serves as the indicator of core power. Apparatus is provided for sensing certain thermal parameters of the coolant and so relating them that an accurate measure of the total core power is obtained.

It has been generally known that the difference in coolant temperature, i.e. $\Delta T$, between the reactor coolant inlet and the reactor coolant outlet may be used as an approximation of the thermal input to the coolant and accordingly, as an approximation of core power. However, this simple measure fails to account for variables such as changes in coolant mass and specific heat which result from changes in the reactor inlet coolant temperature, $T_c$, and the average coolant temperature, $T_{avg}$, respectively. For this reason a simple measure of coolant $\Delta T$ is incapable of accurately indicating reactor power at any power level other than a single steady state level at predetermined constant $T_c$ and $T_{avg}$ conditions.

In the invention various primary loop coolant temperatures are sensed and used to synthesize a core power signal. The synthesized signal is accurate at all power levels across the operating range and responds accurately to slow and intermediate speed power transients. The circuitry of the invention obtains a basic $\Delta T$ measurement of the coolant temperature increase across the reactor core and then corrects it for the effects of $T_c$ and $T_{avg}$. The circuitry additionally includes a compensation network which improves the dynamic response characteristics of the synthesized $\Delta T$ power measure signal. Values for the various multiplication constants of the synthesized signal are determined through an on-line calibration procedure which fits the $\Delta T$ power signal to actual reactor power at several power levels within the operating range. This results in a power measure signal which is accurate across the power range and particularly at the calibration point powers.

In each of two separate embodiments of the invention the accuracy of the $\Delta T$ power signal, particularly during steady state or slow to intermediate speed power transient operation, is combined with the faster response of the capability of neutron flux power signal with regard to rapid power transients in a manner which exploits the advantages of each while avoiding the inherent limitations of either, thus resulting in a more accurate determination of core power for a variety of system conditions.

BRIEF DESCRIPTION OF THE DRAWINGS

FIG. 7 is a functional schematic of one embodiment of the invention showing means for interrelating the flux power signal and ΔT power signal advantageously; and FIG. 8 graphically depicts a second embodiment of the invention in which second means are depicted for interrelating the flux power signal and ΔT power signal advantageously.

DESCRIPTION OF THE PREFERRED EMBODIMENT

The invention relies in large measure on the relationship which states that $B \approx Q \approx km\ C_p \Delta T$, where B is reactor core power, Q is the thermal energy absorbed by the coolant in passing through the core, $k$ is a system constant caused by losses and effects of a constant nature, $m$ is the coolant mass flow rate, $C_p$ is the specific heat of the coolant for the average coolant temperature, and ΔT is the difference in coolant temperature measured between the coolant inlet to the reactor (cold side) and the coolant outlet from the reactor (hot side).

As seen from the relationship in the preceding paragraph, a change in either the coolant mass flow rate or the coolant specific heat will affect the value of ΔT for a particular reactor power.

The coolant mass flow rate will vary because of changes in volumetric flow or coolant density. In many nuclear plants the coolant pumps are designed for constant volumetric flow, thus leaving coolant density as a possible variable which may affect mass flow rate. Even in instances in which there is some variation in the volumetric flow of the pumps, the variation is repeatable at a given power and coolant temperature and will be accounted for in the ΔT power signal.

The specific heat of the coolant, $C_p$, is the amount of heat required to change the temperature of a unit mass through one degree. The specific heat of the coolant between the reactor coolant inlet and outlet is, for convenience, taken to be that for the average coolant temperature across the reactor. The coolant average temperature is that temperature obtained by adding the inlet temperature and outlet temperature and dividing the sum by two.

In nuclear power plants, both the density of the coolant at the pumps and the specific heat of the coolant are subject to variation, either because of the plant operating program or unintended excursions therefrom. Therefore, a measure of power based on the ΔT measurement and corrected for the varying effects of coolant density and specific heat has been developed.

In describing the invention water is the coolant referred to. Also a system employing nominally constant volumetric flow pumps is used. This avoids the need for having to use variations in pump flow as a separate input variable. It will be realized, however, that such might be done if necessary. In the instance in which the ΔT measure of power is employed in a protection related capacity, the volumetric flow of the coolant pumps will be monitored independently to measure operation at or near a constant value.

Figure 1:
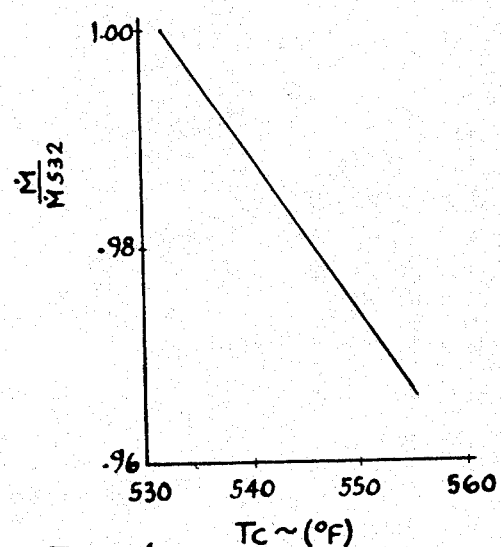
FIG. 1 graphically plots the primary coolant mass flow rate normalized to the mass flow rate at 532° F. versus cold leg temperature, $T_c$.

FIG. 1 is a plot of the variation of primary coolant mass flow rate normalized to the mass flow rate at 532° F. with respect to the cold side coolant temperature, $T_c$. As the pumps are operating with a near constant volumetric flow, the variation is caused by a change in coolant density. As the temperature of the cold side coolant going through the pumps increases, the density decreases causing a decrease in the coolant loop mass flow rate. Since the thermal energy absorbed by the coolant passing through the core is proportional to the mass flow rate ($m$), specific heat ($C_p$) and temperature rise (ΔT), the $C_p$ΔT product must increase if the mass flow rate decreases.

Figure 2:
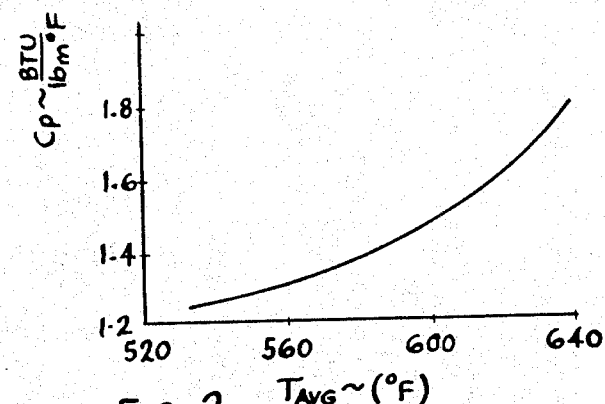
FIG. 2 graphically plots the primary coolant specific heat versus average coolant temperature, $T_{avg}$.

FIG. 2 shows the second temperature dependent effect on the ΔT measured power. This effect is the dependency of the coolant specific heat ($C_p$) on the average temperature of the coolant. As the average temperature of the coolant increases, $C_p$ increases non-linearly therewith. Water is the coolant or medium for which the FIG. 2 graph is applicable.

The sold side temperature, the hot side temperature, and the average temperature of the coolant are functionally interrelated. This permits both the coolant density and specific heat effects to be determined as functions of any one of the coolant temperature parameters, such as coolant average temperature, $T_{avg}$ and reactor power. Coolant average temperature, $T_{avg}$, is that chosen herein to which the ΔT variations at a constant power are related. It should be recognized that the specific heat and coolant density effects on ΔT might also be determined and corrected as functions of the hot side coolant temperature or the cold side coolant temperature.

Figure 3:
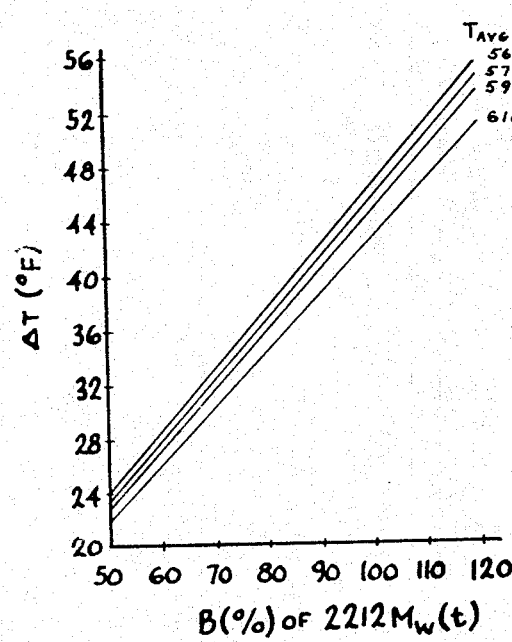
FIG. 3 graphically compares the measured $\Delta T$ with actual core power for several values of average coolant temperature, $T_{avg}$.

FIG. 3 compares measured ΔT with actual core power for several values of coolant average temperatures, $T_{avg}$. It is seen that the two effects of coolant density change and specific heat change work to offset one another to a certain extent. However, the net effect is seen in FIG. 3 wherein the temperature dependency of the specific heat is greater than the temperature dependency of the coolant density since ΔT decreases with increasing average coolant temperature when the reactor is at a constant power level.

Figure 4:
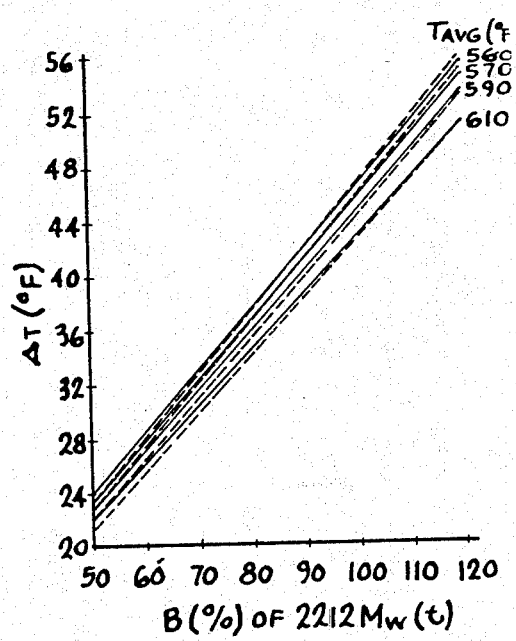
FIG. 4 graphically plots the calculated core power and the actual core power versus system $\Delta T$ for several values of average coolant temperature, $T_{avg}$.

From the above discussion a mathematical expression is formulated wherein $B = k_1\ T + k_2 \Delta T(T_{avg})$, wherein B is the calculated core power, ΔT is the measured coolant temperature difference between the cold and hot side of the coolant circuit, $T_{avg}$ is the average of hot and cold leg temperatures, and $k_1$ and $k_2$ are constants determined by an on-line calibration procedure. A plot of both the calculated core power, shown in dotted line, and the actual core power, shown in solid line, versus system ΔT for several values of $T_{avg}$ shows in FIG. 4 that the calculated power closely approximates the actual core power.

Because the specific heat of the coolant is a non-linear function of the coolant average temperature, the ΔT dependency on $T_{avg}$ is not exactly linear. A second order component which varies as the square of ΔT, if added to the previously stated expression of calculated power $B = k_1 \Delta T + k_2 \Delta T(T_{avg})$, results in the more accurate expression $B = k_1 \Delta T + k_2 \Delta T(T_{avg}) + k_3 \Delta T^2$, where $k_3$ is a constant Both of the above expressions compensate, to different degrees, for the effects of changes in coolant $T_c$ and $T_{avg}$ on the ΔT power measurement. In order to retain the accuracy of the above expressions as a measurment of core-power during power transients, it is necessary to provide a component to the expression which serves as a measure of the rate of heat addition to the stored thermal energy content of the primary loop coolant. This is accomplished by differentiating any primary coolant thermal parameter or combination thereof, multiplying by the appropriate gain factor and adding the product to the steady state ΔT expression of power. This dynamic component of the expression is of the form $$\tau \frac{dT_x}{dt}$$

where $T_x$, broadly is a measure of any primary coolant thermal parameter and $\tau$ is the appropriate gain constant for the expression. This yields either expression $$K_1 \Delta T + K_2 \Delta T(T_{avg}) + \tau \frac{dT_x}{dt}$$

or $$K_1 \Delta T + K_2 \Delta T(T_{avg}) + K_3 \Delta T^2 + \tau \frac{dT_x}{dt}$$

the latter being somewhat more accurate than the former.

Figure 5:
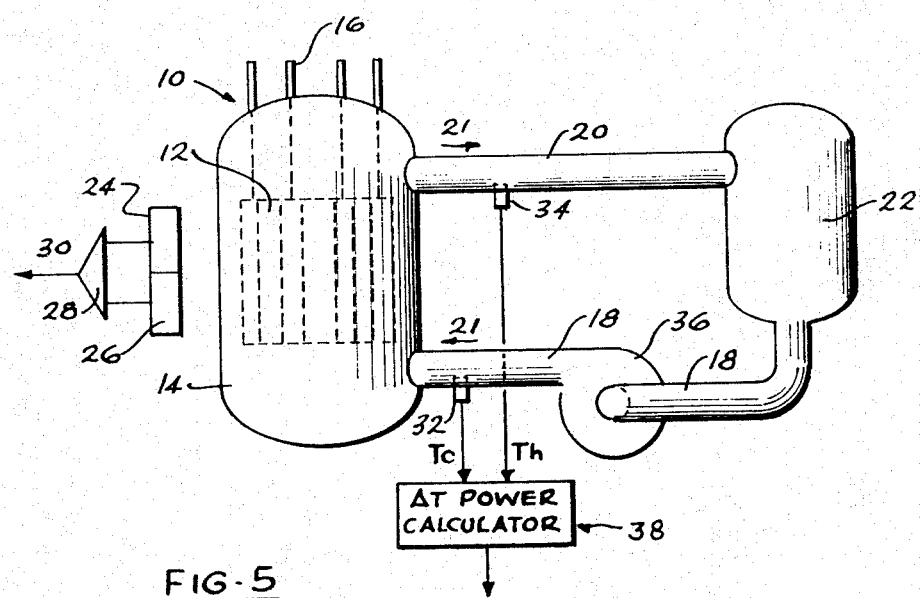
FIG. 5 is a schematic illustration of a reactor and accompanying coolant circuit showing the neutron flux and coolant temperature sensors.

FIG. 5 is a schematic illustration of a reactor and coolant circuit showing the location of the neutron flux and coolant temperature sensors. Reactor 10 includes a core portion 12 and a pressure vessel 14. Control rods 16 are movable into and out of the core 12. A coolant circuit has a cold side 18 connected to the reactor coolant inlet and a hot side 20 connected to the reactor coolant outlet. The coolant, which is generally water, enters the reactor from the cold side, passes through the core obtaining heat therefrom and exits at the hot side as shown by arrows 21. A load, such as heat exchanger 22, is connected across the reactor.

Neutron flux sensors 24 and 26 may be located within the reactor core or externally of the pressure vessel, as shown. These detectors may be more or less than 2 in number, may be vertically or horizontally disposed, and may be at one or several locations about the circumference of the core. However, all of the configurations are subject to some degree of shadowing of the flux by the rods and coolant. In the system of FIG. 5, sensors 24 and 26 are comprised of a dual section ion chamber which extends the length of core 12. Their respective outputs are signal voltages or currents which are proportional to the incident neutron flux. The signals of sensors 24 and 26 are summed and amplified by amplifier 28 and the output 30 provides a measure of total core power.

Coolant temperature sensors 32 and 34 are positioned in the cold and hot side portions of the coolant circuit respectively. These sensors are generally of the thermocouple or resistance bulb type, though others may be used. Temperature sensor 32 is depicted as being located between coolant pump 36 and the inlet to reactor 10, however, it might also be located upstream of pump 36. These temperature sensors have transmitters (not shown) electrically connected with them for providing an output signal current or voltage which is proportional to the coolant temperature sensed. In the invention as depicted, only a single primary coolant loop is shown, however, it is evident that a plurality of primary coolant loops may exist, and that the hot and cold side temperatures of each may be sensed and averaged or auctioneered with the respective hot and cold side temperatures of the other primary loops.

The representative cold and hot side temperature signals, $T_c$ and $T_h$ respectively, from sensors 32 and 34 are connected to the $\Delta T$ power calculator 38, discussed in more detail below.

The $\Delta T$ power calculator 38 may be any of various well-known types of hard-wired or programmable electronic calculators or computers capable of processing electrical input signals in accordance with the program or expression developed hereinbelow. The output signal 40 from calculator 38 is proportional to the sum of the thermal energy absorbed by the coolant in passing through the core and the rate of heat addition to the stored thermal energy content of the coolant. Signal 40 accordingly provides a measure of total core power.

Figure 6:
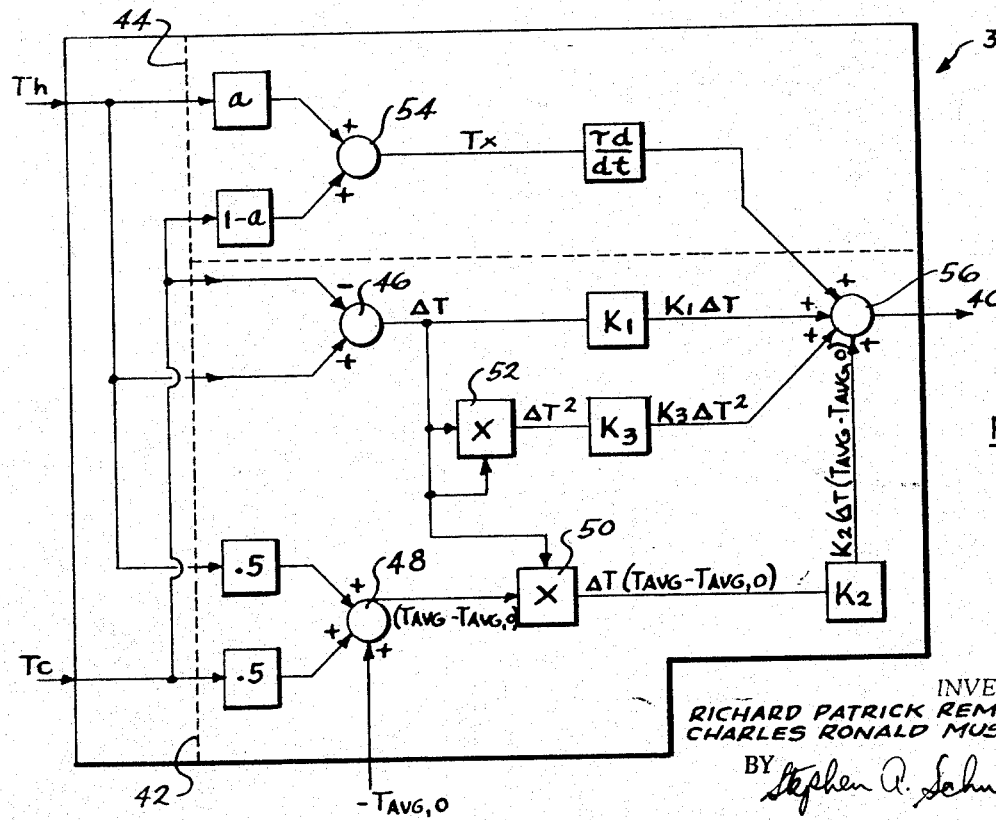
FIG. 6 is a functional schematic of the ΔT power signal calculator.

FIG. 6 is a functional schematic of the $\Delta T$ power calculator 38. The calculator includes a section 42 for the synthesis of a steady state $\Delta T$ power measure signal and a section 44 for the synthesis of a signal which provides dynamic compensation to the steady state signal.

Steady state signal section 42 receives input signals $T_h$ and $T_c$ and at summing unit 46 the difference is obtained to provide the $\Delta T$ signal. The $\Delta T$ signal is then multiplied by constant $K_1$ and results in a signal $k_1 \Delta T$, which represents the primary component of the composite $\Delta T$ power signal.

The $T_h$ and $T_c$ signals are also each connected to 0.5 multipliers and the outputs therefrom provide inputs to summing unit 48. The summed values of $0.5T_h$ and $0.5T_c$ are a measure of the average coolant temperature and accordingly, a measure of the chosen coolant thermal parameter to which the FIG. 3 and FIG. 4 data apply.

The output signal from summing unit 48 may be a total measure of the average coolant temperature, however, a signal which is referenced to some temperature in or near the normal operating range of the reactor is of equal applicability and of a less cumbersome magnitude. A convenient reference is one at or near the design condition temperature, in this instance 565° F. Accordingly, a bias signal, $-T_{avg,0}$, indicates the design condition average coolant temperature and is summed with the actual average coolant temperature signal at summing unit 48 with a resulting output signal ($T_{avg} - T_{avg,0}$).

The $\Delta T$ signal from summing unit 46 is multiplied with the $T_{avg} - T_{avg,0}$ signal from summing unit 48 at multiplier 50. The resulting signal, $\Delta T(T_{avg} - T_{avg,0})$, varies as the product of $\Delta T$ and the chosen plant coolant thermal parameter ($T_{avg} - T_{avg,0}$). This signal is then multiplied by constant $k_2$ to provide $k_2 \Delta T(T_{avg} - T_{avg,0})$. The $\Delta T$ signal is squared by employing two inputs of multiplier 52. The output signal for multiplier 52 varies as the square of the $\Delta T$ signal and is multiplied by constant $k_3$ to provide $k_3 \Delta T^2$.

The measure of core power as calculated from coolant thermal parameters is made more accurate for slow and intermediate speed power transients by dynamically compensating the steady state expression with a measure of the rate of heat addition to the stored thermal energy content of the primary loop coolant. This is accomplished by differentiating any primary coolant thermal parameter or combination thereof, multiplying by the appropriate gain factor and adding the product to the steady state $\Delta T$ expression of power.

Dynamic compensation section 44 requires, as an input, a primary loop coolant temperature or combination of primary loop coolant temperatures. A weighted average of the $T_h$ and $T_c$ signals is used and it is differentiated and a gain factor applied as mentioned above. A filter may be used if noise suppression is desired.

The mathematical expression solved by the dynamic compensation section 44 is of the general form $$B_d = \tau \frac{d}{dt}[T_x]$$

where $B_d$ is the calculated value of the dynamic portion of the calculated $\Delta T$ power measure, $\tau$ is derivative gain and $$\frac{d}{dt}[T_x]$$

is the derivative of $T_x$ where $T_x$ is the weighted average described below. $T_x$ is expressed as $[aT_h + (1-a)T_c]$ where $T_h$ and $T_c$ are hot side and cold side temperatures, respectively. The dynamic compensation section 44 differentiates this weighted average of the $T_h$ signal and the $T_c$ signal. The $T_h$ signal is multiplied by weighting factor "$a$" and the $T_c$ signal is multiplied by weighting factor "$1-a$." The two resulting signals are summed at summing unit 54 to provide signal $T_x$. Functional block $$\tau \frac{d}{dt}$$

receives the output signal $T_x$ from summing unit 54 and differentiates it applying a derivative gain $\tau$.

The output signal from dynamic compensation unit 44 is applied to the input of summing unit 56 as are the $k_1 \Delta T$, the $k_2 \Delta T(T_{avg} - T_{avg,0})$ and the $k_3 \Delta T^2$ signals. Summing unit 56 adds these component signals and provides a resulting out put signal 40 which varies as $$k_1 \Delta T + k_2 \Delta T(T_{avg} - T_{avg,0}) + k_3 \Delta T^2$$

$$+ \tau \frac{d}{dt}[aT_h + (1-a)T_c].$$

This signal is a specific and preferred example of the more general expression $$K_1 \Delta T + K_2 \Delta T (T_{avg}) + K_3 \Delta T^2 + \tau \frac{dt_x}{dt}$$

developed earlier. It will be appreciated that output signal 40 might also be provided with the second order $\Delta T^2$ component omitted from the expression as discussed earlier. In such instance, a small degree of accuracy is sacrificed to reduce the required capabilities of calculator 38.

The constants $k_1$, $k_2$, and $k_3$ for the steady state portion of signal 40 are determined by bringing the plant to steady state operation at each of three selected points in the region of permissible plant operation, performing a plant calorimetric or heat balance at each point to accurately determine reactor power, and recording the signal values for $\Delta T$, $(T_{avg} - T_{avg,O})$ and $\Delta T^2$ at each of the three selected points. The values for the variables $\Delta T$, $(T_{avg} - T_{avg,O})$ and $\Delta T^2$ at the three selected points may then be used with the power levels determined by the calorimetrics performed at each of the three points to solve simultaneously three equations of the form $B = k_1 \Delta T + k_2 \Delta T (T_{avg} - T_{avg,O}) + k_3 \Delta T^2$. Each equation uses data obtained at a different one of the three points and there simultaneous solution results in values for $k_1$, $k_2$, and $k_3$ which ensure that signal 40 is accurate at the plant conditions which existed for the three selected points.

Of the three operating points selected for the calibration procedure, two should be on the intended plant coolant temperature program and in the upper half of the plant power range and spaced widely apart from one another. The third point is preferably near the maximum steady state power and several degrees (F.) below the plant coolant temperature program to provide good data for the calculation of $k_2$.

The constants "$a$" and "$\tau$" for the dynamic compensation section 44 are established by an on-line calibration procedure which compares the dynamic compensation 40 signal with the response deficiency of the uncompensated $\Delta T$ steady state signal for various plant power transients. The "$a$" and "$\tau$" values finally determined provide the dynamic compensation signal which best approximates the deficiency of the $\Delta T$ steady state signal.

The $\Delta T$ power signal 40 is an accurate indicator of total reactor core power and, through its dynamic compensation, accurately responds to power transients which result from actions such as a slow uncontrolled rod withdrawal, step changes in plant turbine load, and controlled ramp changes in power over the normal load range.

In each of two alternate embodiments of the invention, the $\Delta T$ power signal 40, which is unaffected by the neutron flux shadowing factors, is related to or compared with the flux power measure signal 30 provided by the neutron flux sensors and circuitry. This interrelating of the two independent measures of total core power is done in a manner and by means which, in one instance, results in an effective indication of the core having exceeded predetermined power limits regardless of flux shadowing or the speed of the power transient, and in the other instance results in a measure of core power which is more accurate across substantially the entire power range for both steady state power conditions and for slow and rapid power transients than heretofore possible with only the neutron flux power measure.

As depicted in FIG. 7 the core power signal 30 obtained from neutron flux measurements and the core power signal obtained from measurements of coolant thermal parameters are each applied as inputs to separate reactor trip signal generator channels 58 and 60, respectively.

A trip set point voltage 62 is supplied to a bistable trip signal generator channel 60. Set point voltage signal 62 is set to a value which will cause the bistable circuit of trip signal generator 60 to generate a trip signal 64 when $\Delta T$ power signal 40 exceeds a value representative of about 105 or 106 percent power.

A trip set point voltage 66 is connected to trip signal generator channel 58. Set point voltage signal 66 is set to a value which will cause the bistable circuit of trip signal generator 58 to generate a trip signal 68 when flux power signal 30 exceeds a value of about 110 percent power.

The "staggering" of the trip set points for the two different measures of core power is possible because the fuel rod center line temperature is the critical factor in overpower transients and, because there is a thermal delay time constant of several seconds associated with the fuel rods, the overpower range between the two trip setpoints will permit brief overpower operation in that area so long as it does not go beyond the upper trip limit.

This arrangement of "staggered" trip set points applied to the two power measure signals 30 and 40 results in the accurate but slower $\Delta T$ power signal 40 serving a protective tripping function at a power only slightly above 100 percent of rated power, while the "faster" neutron flux power signal 30 which is subject to shadowing effects completes the overpower protection function by tripping at an indicated flux power level which is sufficiently above the desired trip power to avoid erroneous reactor trips but is low enough to quickly respond to rapid overpower transients.

It should be realized that the values of set point signals 62 and 66 may correspond with slightly different power levels than those set forth herein, but the relationship to one another will be essentially the same.

In the embodiment of the invention depicted in FIG. 8 the flux power measure signal 30 is compared with the $\Delta T$ power measure signal 40 at power comparator 70. Signals 30 and 40 are provided as inputs to comparator 70 and the output signal 72 varies directly as the difference between signals 30 and 40. Signal 72 is a measure of the deviation of one of the input signals with respect to the other. The flux power-$\Delta T$ power deviation signal 72 is fed to a meter relay 74 which gives a visual read-out of the difference between signals 30 and 40. An additional alarm circuit 76 may be used to audibly and/or visually alarm when a deviation signal greater than some predetermined magnitude occurs. Either of signals 30 or 40 may be connected to digital volt meter 78 to obtain a read-out in "percent power."

In response to a difference between the two power measure signals 30 and 40 as indicated either at meter relay 74 or by alarm 76, the gain of the flux power measure signal is adjusted to null the difference between it and the $\Delta T$ power measure signal.

As the neutron flux power signal 30 is subject to flux shadowing effects, the $\Delta T$ power signal 40 is the reference to which flux power signal 30 is adjusted or recalibrated. Adjustability of the flux power signal gain is provided for by variable potentiometer 80 placed in series with the flux power signal 30. A variable potentiometer 82 may also be placed in series with the $\Delta T$ power signal for adjusting signal gain each time a plant heat balance or calorimetric is performed.

The $\Delta T$ power signal 40 is an accurate measure of total core power at steady state condition and during slow and intermediate speed power transients. Therefore, in the preferred mode of operation, potentiometer 80 is adjusted to null out the difference between the two power measure signals. The acknowledgment of a deviation in the signals and the subsequent adjusting of potentiometer 80 to obtain a null deviation condition may be performed manually by a human operator or by an electromechanical servocontrol system which monitors the deviation signal 72 and in response thereto adjusts the setting of potentiometer 80.

Either method of balancing the flux power signal 30 to the $\Delta T$ power signal 40 results in a flux power signal which is corrected for errors which might arise due to flux shadowing factors. The corrective action may occur rapidly if done electromechanically and need be only slightly slower if done manually, however, a delay of several seconds is preferable to avoid adjusting the flux power signal gain during rapid power transients.

Consequently, because of the "forced" accuracy of a flux power signal 30, its use as a trip signal for the reactor protection system permits using a trip set point value which closely approaches maximum permissible actual core power. This is seen where flux power signal 30 is connected to the input of bistable trip signal generator 84 and trip set point voltage 86 applied thereto has a set point value equal to 106.5 percent power.

This "forced" accuracy of the power measure signal used for reactor trip purposes permits setting the trip level closer to the actual permissible power limit without fear of undetected overpower excursions of an intolerable nature and without causing unnecessary or erroneous reactor trips.

It will be evident to those experienced in this art that the invention is applicable to nuclear systems having a single primary coolant loop or as more common, to those having a plurality of primary coolant loops. The measured temperatures used in the $\Delta T$ power calculator should be representative of the entire primary coolant system and accordingly may be an average of temperatures obtained for the same parameter in the several primary loops or may be a single measured temperature which best represents the parameter being measured for the combined primary loops.

While two preferred embodiments of the invention have been illustrated and described, it is to be understood that such are merely illustrative and not restrictive and that variations and modifications may be made therein without departing from the spirit and scope of the invention. We, therefore, do not wish to be limited to the precise details set forth but desire to avail ourselves of such changes as fall within the purview of our invention.

We claim:

1. In a nuclear reactor system including a reactor core, a coolant circuit through said core, and coolant circulating means, said coolant circuit having a cold side at the inlet to the reactor and a hot side at the outlet from the reactor, apparatus for providing at least two independent measures of total core power, the first measure being more accurately responsive to rapid power transients and the second measure being unaffected by flux measurement errors and responding accurately to slower power transients, comprising:
    means responsive to incident neutron flux in proximity with said core for providing a signal which varies as said incident flux, said signal providing said first measure of core power; and
    means responsive only to coolant thermal parameters for providing said second measure of core power including,
    first means for sensing the temperature of said coolant at said coolant circuit cold side,
    a first transmitter connected to said first temperature sensing means for providing an electrical signal which is indicative of the sensed cold side coolant temperature,
    second means for sensing the temperature of said coolant at said coolant circuit hot side,
    a second transmitter connected to said second temperature sensing means for providing an electrical signal which is indicative of the sensed hot side coolant temperature, and
    electrical calculating means having said hot side temperature signal and said cold side temperature signal connected as inputs thereto for providing an output signal which varies as $$k_1 \Delta T + k_2 \Delta T (T_{avg}) + \tau \frac{dT_x}{dt}$$

where:
   $\Delta T$ is the difference between the hot side temperature signal and the cold side temperature signal,
   $T_{avg}$ is proportional to the sum of the hot side coolant temperature signal and the cold side temperature signal,
   $k_1$ and $k_2$ are gain constants,
   $\tau$ is derivative gain factor, and
   $\frac{dT_x}{dt}$ is the time derivative of $T_x$ where:
   $T_x$ is a weighted average of the hot side temperature signal and the cold side temperature signal,
said output signal providing said second measure of core power.

2. The apparatus of claim 1 wherein said electrical calculating means additionally provides a component to said output signal which varies as $k_3 \Delta T^2$, where $k_3$ is a gain constant.

3. The apparatus of claim 1 further comprising: electrical circuit means having said first and second core power measure signals as inputs for interrelating said first and second core power measure signals.

4. The apparatus of claim 3 wherein said electrical circuit means for interrelating said first and second core power measure signals comprise:
    signal comparison means having said first and second core power measure signals connected as inputs for providing a deviation signal indicative of a difference between said first and second core power measure signals; and
    signal gain adjusting means connected with at least said first core power measure signal for adjusting the gain of said first core power measure signal to null said deviation signal.

5. The apparatus of claim 3 wherein said electrical circuit means for interrelating said first and second core power measure signals comprise:
    a first signal generator for generating a reactor trip signal, said first core power measure signal being connected thereto and said first signal generator is biased to provide said trip signal at and above a first power level as indicated by said connected first power measure signal; and
    a second signal generator for generating a reactor trip signal, said second core power measure signal being connected thereto and said second signal generator is biased to provide said trip signal at and above a second power level as indicated by said connected second power measure signal, said second power level being lower than said first.

6. The apparatus of claim 5 wherein:
    the power level at and above which said first signal generator is biased to provide said trip signal is about 106 percent of indicated power; and the power level at and above which said second signal generator is biased to provide said trip signal is about 110 percent of indicated power.

7. In a nuclear reactor system having a reactor core, a coolant circuit through said core and means for circulating said coolant, said coolant circuit having a cold side at the inlet to the reactor and a hot side at the outlet from the reactor, the method of providing at least two independent measures of total core power comprising the steps of:
    sensing neutron flux in proximity to the reactor core;
    generating electrically a flux power signal which varies as said sensed neutron flux, said flux power signal providing one said measure of total core power;
    sensing coolant temperatures at said coolant circuit, hot side and cold side locations;
    generating electrically a signal indicative of the coolant temperature sensed at said hot side location;

generating electrically a signal indicative of the coolant temperature sensed at said cold side location; and generating electrically a core power signal, using only said coolant circuit hot side and cold side temperature signals as input signals which varies as $$k_1 \Delta T + k_2 \Delta T (T_{avg}) + k_3 \Delta T^2 + \tau \frac{dT_x}{dt}$$

where $\Delta T$ is the difference between the hot side temperature signal and the cold side temperature signal, $T_{avg}$ is proportional to the sum of the hot side coolant temperature signal and the cold side temperature signal, $k_1$, $k_2$ and $k_3$ are gain constants, $\tau$ is a derivative gain factor, and $\frac{dT_x}{dt}$ is the time derivative of $T_x$ where $T_x$ is a weighted average of the hot side temperature signal and the cold side temperature signal, said signal providing said second measure of core power.

8. The method of claim 7 further comprising the steps of:

comparing said first and second core power measure signals;

generating a deviation signal when the difference between the compared signals is not zero; and adjusting the gain of said flux power signal to null said deviation signal, said adjusted flux power signal providing an accurate measure of core power.

References Cited

UNITED STATES PATENTS

| | | | |
|---|---|---|---|
| 3,356,577 | 12/1967 | Fishman | 176—24 |
| 3,341,422 | 9/1967 | Gilbert | 176—20 R |
| 3,423,285 | 1/1969 | Curry et al. | 176—24 |
| 3,421,978 | 1/1969 | Gullion et al. | 176—20 R |

FOREIGN PATENTS

| | | | |
|---|---|---|---|
| 887,302 | 1/1962 | Great Britain | 176—24 |
| 952,022 | 3/1964 | Great Britain | 176—19 E C |
| 586,926 | 11/1959 | Canada | 176—24 |

OTHER REFERENCES

Pp. 21 and 22 from section 7.2 of the Final Safety Analysis Report of the Turkey Point Nuclear Power Station, May 12, 1969, cite as microfilm No. 5250—12 and 13 in A.E.C. Public Documents Room.

REUBEN EPSTEIN, Primary Examiner

U.S. Cl. X.R.

176—20 R, 24